United States Patent
Keren

(10) Patent No.: US 8,998,113 B2
(45) Date of Patent: Apr. 7, 2015

(54) DRIP IRRIGATION EMITTER

(75) Inventor: Ron Keren, Negev (IL)

(73) Assignee: Netafim, Ltd., Tel Aviv (IL)

( * ) Notice: Subject to any disclaimer, the term of this patent is extended or adjusted under 35 U.S.C. 154(b) by 364 days.

(21) Appl. No.: 13/587,676

(22) Filed: Aug. 16, 2012

(65) Prior Publication Data

US 2012/0305676 A1 Dec. 6, 2012

Related U.S. Application Data

(63) Continuation of application No. PCT/IL2011/000154, filed on Feb. 14, 2011.

(60) Provisional application No. 61/305,552, filed on Feb. 18, 2010.

(51) Int. Cl.
*A01G 25/02* (2006.01)

(52) U.S. Cl.
CPC .................................. *A01G 25/023* (2013.01)

(58) Field of Classification Search
CPC .................................................. A01G 25/023
USPC ......... 239/542, 569, 510, 571, 196, 195, 201; 47/79; 137/859
See application file for complete search history.

(56) References Cited

U.S. PATENT DOCUMENTS

| 5,111,996 | A | 5/1992 | Eckstein | |
|---|---|---|---|---|
| 6,206,305 | B1 * | 3/2001 | Mehoudar | 239/542 |
| 6,250,571 | B1 | 6/2001 | Cohen | |
| 7,648,085 | B2 * | 1/2010 | Mavrakis et al. | 239/542 |
| 8,511,585 | B2 * | 8/2013 | Keren | 239/542 |
| 2006/0163388 | A1 * | 7/2006 | Mari | 239/542 |
| 2010/0155508 | A1 * | 6/2010 | Keren | 239/542 |

OTHER PUBLICATIONS

International Search Report in PCT/IL2011/000154, dated Aug. 8, 2011.
Written Opinion in PCT/IL2011/000154, dated Aug. 8, 2011.

* cited by examiner

*Primary Examiner* — Justin Jonaitis
(74) *Attorney, Agent, or Firm* — Womble Carlyle

(57) ABSTRACT

A drip irrigation emitter receives liquid flowing in an irrigation pipe at an inlet pressure and emits the liquid out of the emitter at an outlet pressure lower than the inlet pressure. The emitter has a flow path through which the liquid flows in the emitter, wherein below a threshold pressure of liquid in the pipe the emitter is adapted to emit a regulated flow of liquid out of the emitter, and above the threshold pressure of liquid in the pipe the emitter is adapted to emit a non-regulated flow of liquid out of the emitter.

28 Claims, 3 Drawing Sheets

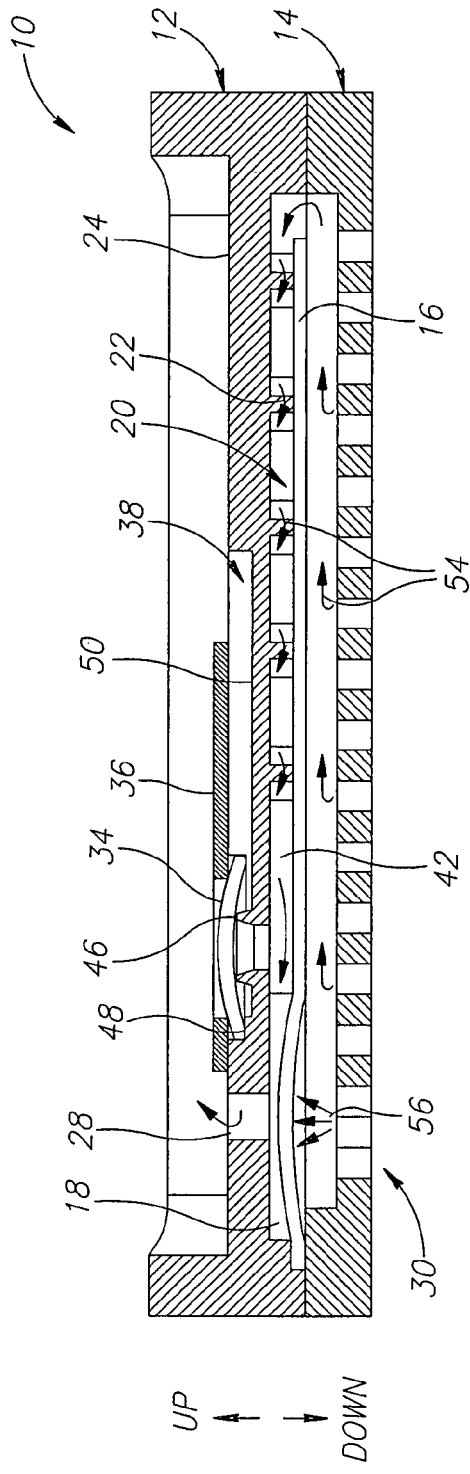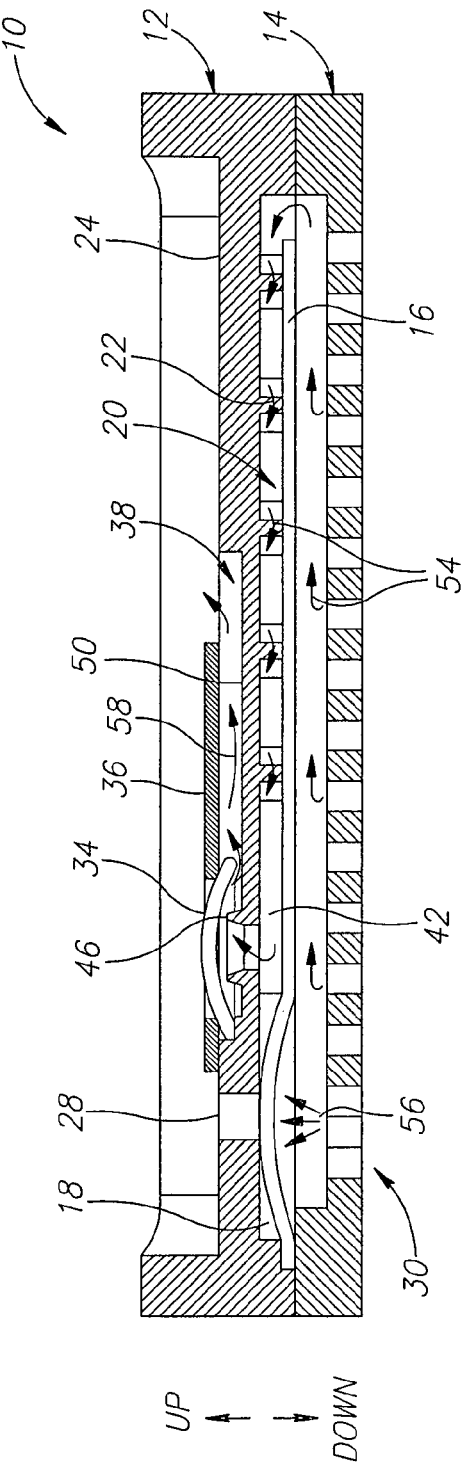

DRIP IRRIGATION EMITTER

RELATED APPLICATIONS

This is a Continuation of PCT/IL2011/000154, which was filed 14 Feb. 2011 and published as WO 2011/101842A2 on 25 Aug. 2011, and which claims priority to U.S. Provisional Patent Application No. 61/305,552, filed 18 Feb. 2010. The contents of the above-identified applications are incorporated by reference in their entirety.

TECHNICAL FIELD

The present disclosure relates to drip irrigation emitters that are used to control the provision of liquid to plants.

BACKGROUND

Such drip emitters are normally coupled to an irrigation pipe and are provided with an inlet, an outlet and a flow-restricting path therebetween. Liquid passing from the pipe via the inlet into the emitter; traverses through the flow-restricting path to be released at the outlet of the emitter at a relatively low discharge pressure generally equal to about zero.

U.S. Pat. No. 6,250,571, the disclosure of which is incorporated herein by reference, describes a drip irrigation emitter having a non-regulating labyrinth that functions to reduce pressure of water entering the emitter before it reaches a regulating labyrinth. A modification of the emitter has an opening that serves as an outlet from the non-regulating labyrinth and an inlet to the regulating labyrinth. This opening is covered by a membrane that functions as a one-way valve permitting flow of water only from the non-regulating labyrinth to the regulating labyrinth.

U.S. Pat. No. 5,111,996, the disclosure of which is incorporated herein by reference, describes an emitter having valves that are used to control the length of a fluid flow limiting passageway. The passageway is divided into sections and as the pressure in the pipe increases beyond predetermined values, valves that are located along the passageway close to force fluid to flow through additional sections of the passageway.

SUMMARY

The following embodiment and aspects thereof are described and illustrated in conjunction with systems, tools and methods which are meant to be exemplary and illustrative, not limiting in scope.

In an embodiment, a drip irrigation emitter comprises an inlet through which liquid enters the emitter from an irrigation pipe, an outlet communicating with the outside environment, a flow path extending between the inlet and outlet, said flow path comprising pressure reducing flow parts, a venting zone and a regulating zone for regulating the flow of liquid exiting the emitter via the outlet, the emitter further comprising a duct that is adapted to provide fluid communicating between the venting zone and the outside environment above a threshold pressure of liquid in the pipe.

Optionally, the venting zone is located between the pressure reducing parts and the regulating zone.

Optionally, a seal of the emitter may prevent fluid communication via the duct below the threshold pressure and allow fluid communication via the duct above the threshold pressure.

Optionally, the duct comprises pressure reducing parts downstream of the seal.

In another embodiment, a drip irrigation emitter for receiving liquid flowing in an irrigation pipe at an inlet pressure and emitting the liquid out of the emitter at an outlet pressure lower than the inlet pressure, the emitter comprising a flow path through which the liquid flows in the emitter, wherein below a threshold pressure of liquid in the pipe the emitter is adapted to emit a regulated flow of liquid out of the emitter, and wherein above the threshold pressure of liquid in the pipe the emitter is adapted to at least partially emit a substantially non-regulated flow of liquid out of the emitter.

Optionally, the flow path comprises a regulating zone that is adapted to regulate the flow of liquid out of the emitter below the threshold pressure of liquid in the pipe, and wherein above the threshold pressure of liquid in the pipe the flow of liquid out of the emitter is substantially not affected by the regulating zone.

In addition to the exemplary aspects and embodiment described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The disclosure, however, both as to organization and method of operation, together with objects, features, and advantages thereof, may best be understood by reference to the following detailed description when read with the accompanying figures, in which:

FIGS. 5A and 5B show cross sectional views of the drip emitter of FIG. 1.

Figure 1:
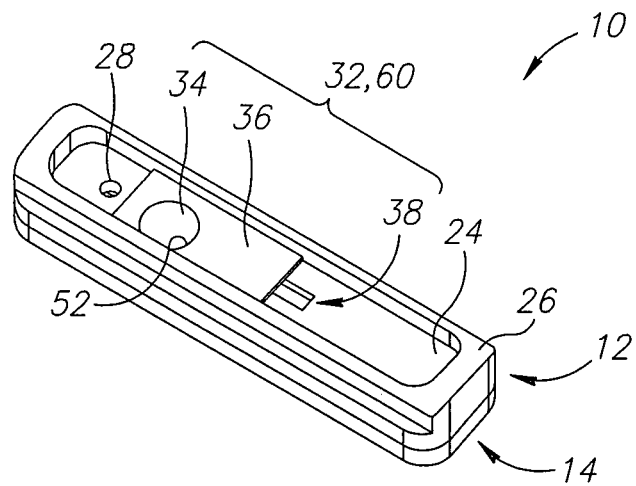
FIG. 1 shows a perspective top view of a drip emitter in accordance with the present disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Figure 2:
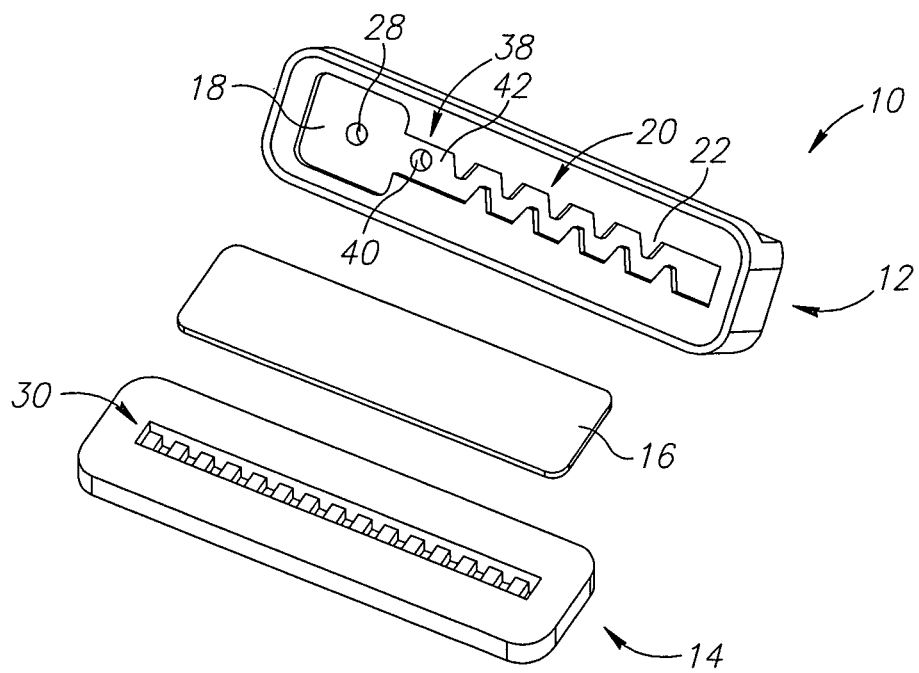
FIG. 2 shows an exploded view of the drip emitter of FIG. 1.

Attention is first drawn to FIGS. 1 and 2. A drip irrigation emitter 10 has a body 12, a cover 14 and a flexible diaphragm 16 that is pressed therebetween. A flow path 20 of the emitter 10 has a regulating zone 18 in an optional form of a chamber or cavity that is formed on a lower side of the body 12. Pressure reducing parts 22 of the flow path 20 are formed along a portion of the flow path 20 that empties downstream into the regulating zone 18. The pressure reducing parts 22, which in this example are in the form of baffle teeth that project into the flow path 20, exhibit a relatively high resistance to liquid flow per unit length and as a result the pressure of liquid entering the emitter 10 at a relatively high inlet pressure drops rapidly as liquid flows therethrough.

The body 12 of the emitter 10 has in addition a recess 24 formed on an upper side thereof that is bound by a peripheral wall 26. An outlet 28 of the emitter 10 that extends through the body 12 communicates between the regulating zone 18 and the recess 24. In an embodiment, the emitter 10 is adapted to attach at the body's upper side to an irrigation pipe (not shown) with a portion of the pipe overlying the recess 24. An aperture, for example, formed in that portion of the pipe (not shown) provides fluid communication between the recess 24, and thereby the emitter 10, and the outside environment.

The cover 14 has upper and lower sides; and an inlet 30 in an optional form of an elongated channel opens out to the upper and lower sides of the cover 14. Filter ribs forming inlet gaps therebetween are located along the inlet 30 for filtering liquid entering the emitter 10. It should be noted that directional terms appearing throughout the specification and claims, e.g. "forward", "rear", "up", "down" etc., (and derivatives thereof) are for illustrative purposes only, and are not intended to limit the scope of the appended claims. In addition it is noted that the directional terms "down", "below" and "lower" (and derivatives thereof) define identical directions.

Figure 3:
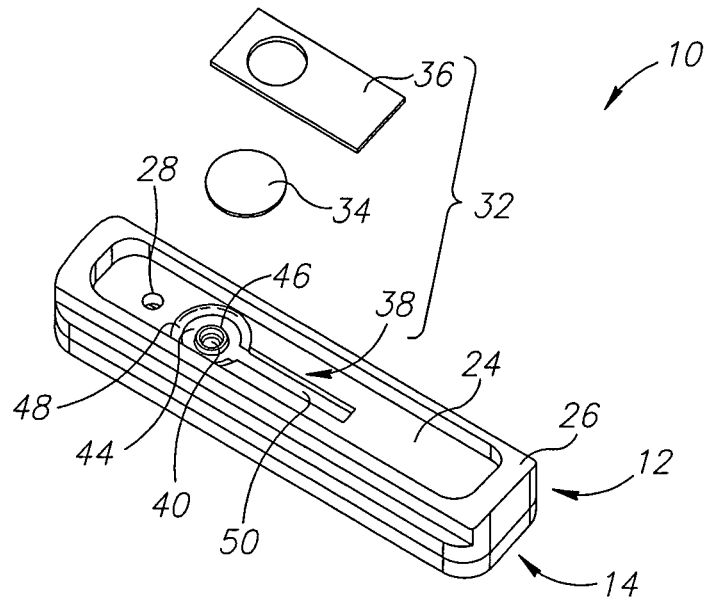
FIG. 3 shows the drip emitter of FIG. 1 with a first embodiment of a valve thereof being shown in an exploded form.

Attention is additionally drawn to FIG. 3. The emitter 10 has a valve 32 in accordance with a first embodiment of the present disclosure that includes a seal 34 in an optional form of a flexible diaphragm, a bracket 36 and a duct 38. The duct 38 has a first part 40 that extends between the upper and lower sides of the body 12 and provides fluid communication between a venting zone 42 (FIG. 2) of the flow path 20 that is located between the regulating zone 18 and pressure reducing parts 22; and a concave hub 44 of the duct 38 that is formed in the recess 24. A raised rim 46 of the valve 32 circumscribes the duct's first part 40 where it opens into the hub 44 and a raised annular support 48 is formed in the hub 44 spaced from the rim 46. A second part 50 of the duct 38 substantially free of pressure reducing obstructions is formed in the recess 24 and communicates with the hub 44 and with the space between the rim 46 and support 48.

Attention is drawn to FIGS. 1, 5A and 5B. The seal 34 is located in the hub 44 with its periphery resting upon the support 48 and a more central circular portion thereof being seated against the rim 46. The bracket 36 has an opening 52 that is located above a portion of the seal 34 thereby pressing the seal 34 to seat against the rim 46 to substantially seal the duct 38 against ingress and egress of liquid. The upper side of the seal 34 is in communication with the recess 24 and thereby with the outside environment and at least a portion of the lower side of the seal 34 that is bound by the rim 46 is in communication with the venting zone 42. The bracket 36 also overlies the hub 44 of the duct 38 and a portion of duct's second part 50 thus forming a closed roofed channel at the duct's second part 50 that opens out into the recess 24 to communicate with the outside environment.

Attention is drawn only to FIG. 5A. Up to a given pressure threshold in the pipe PT, liquid indicated by arrows 54 that entered the emitter 10 from the irrigation pipe (not shown) via the inlet 30 flows in the flow path 20 along a lower side of the diaphragm 16 facing the cover 14 and then enters the body 12 to flow via the pressure reducing parts 22 and venting zone 42 into the regulating zone 18. The pressure of the liquid outside of the emitter 10 and inside the pipe is transmitted via the inlet 30 to a portion of the diaphragm 16 that is located below the regulating zone 18. This pressure is illustrated by short arrows 56.

An increase of liquid pressure in the pipe may cause displacement of that portion of the diaphragm 16 into the regulating zone 18. Resistance to flow of liquid into the regulating zone 18 of the flow path 20 and from the regulating zone 18 via the outlet 28 to the emitter's recess 24 and the outside environment is a function of this displacement. As the displacement of the diaphragm 16 into the regulating zone 18 is increased, this resistance is increased. As a result, the portion of the diaphragm 16 that is located below the regulating zone 18 operates to regulate flow of liquid from the irrigation pipe through the emitter 10 and the flow rate of liquid exiting the emitter 10 is substantially independent of inlet pressure for a given pressure range for which the emitter 10 is designed to operate. Notably other methods of regulating the flow of liquid in the regulating zone 18 may be used in accordance with some embodiments the present disclosure.

Attention is now drawn to FIG. 5B. As pressure of the liquid in the pipe exceeds the predetermined threshold level PT, a pressure differential develops between the lower side of the seal 34 that is exposed to the venting zone 42 and its upper side that communicates with the outside environment. This stretches the seal 34 to unseat from the rim 46 and let liquid indicated by arrow 58 exit the emitter 10 via the duct 38.

In a drip emitter 10 with a valve 32 in accordance with the first embodiment (FIG. 3), the pressure of liquid in the venting zone 42 drops as the seal 34 lifts off the rim 46 to a level substantially equal to that of the outside environment. This may be explained as a result of a rise in the flow rate of liquid passing through the flow path 20 that results in an increase of pressure drop over the flow path 20. In some embodiments, this may result in the pressure on both sides of seal 34 being substantially the same which causes the seal to contract back towards the rim 46 and re-seal the duct 38 to cease the flow of liquid exiting the duct 38.

Under the assumption that liquid pressure in the pipe did not change then the cessation in flow out of the emitter 10 via the duct 38 is only momentary since the pressure differential that caused seal 34 to lift off the rim 46 is reestablished. In general, this "vibration" cycle of sealing and unsealing of the duct 38 may repeat, causing the emitter 10 to repeatedly emit pulses of liquid via the duct 38. Such pulses may form a cleaning process in which foreign matter such as grit or the like that may have accumulated for example in the emitter's flow path 20 is urged to exit the emitter 10 via the duct 38.

Figure 4:
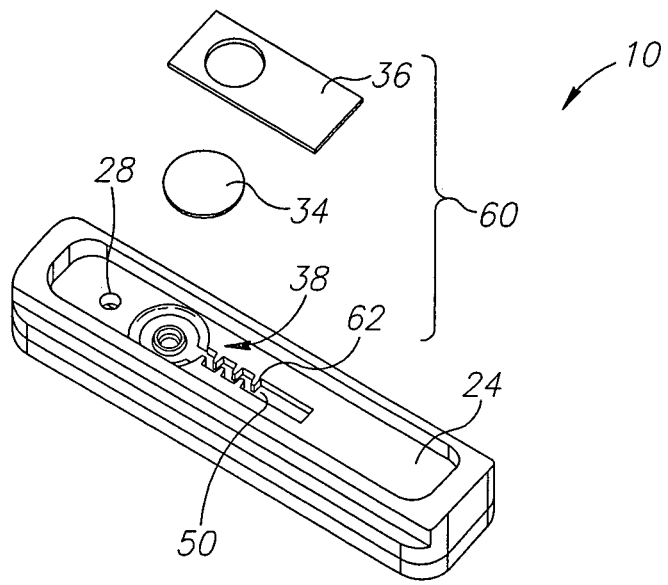
FIG. 4 shows the drip emitter of FIG. 1 with a second embodiment of the valve being shown in an exploded form.

Attention is additionally drawn to FIG. 4 showing a drip emitter 10 having a valve 60 in accordance with a second embodiment of the present disclosure. The structure of the valve's second embodiment 60 is generally similar to that of the first embodiment 32 but with the addition of pressure reducing parts or obstructions 62 that are located downstream of the seal 34 optionally in the second part 50 of the duct 38.

As in the first embodiment, pressure of liquid in the pipe exceeding the predetermined threshold level PT, causes a pressure differential between the lower side of the seal 34 exposed to the venting zone 42 and the upper side of the seal 34 communicating with the outside environment that stretches the seal 34 to unseat from the rim 46 and let liquid exit the emitter 10 via the duct 38. The liquid lifting the seal 34 flows via the pressure reducing obstructions 62 and then exits the duct 38 to communicate with the outside environment. Liquid pressure PU upstream of the pressure reducing obstructions 62 is substantially equal to the liquid pressure below the seal 34. In some embodiments, the pressure of liquid in the pipe is such that the resulting pressure PU below the seal 34 keeps the seal 34 lifted off the rim 46 to maintain a continuous flow of liquid exiting the emitter 10 via the duct 38.

Notably, such a liquid flow that optionally bypasses the regulating zone 18 in emitters 10 that incorporate one of the valves 32, 60; exhibits a non-regulated flow rate that substantially depends on the liquid pressure in the pipe so that a rise of liquid pressure in the pipe will result in a rise in the flow rate of liquid exiting the emitter 10 via the duct 38. In an emitter incorporating valve 60, the pressure of liquid in the pipe that is sufficient to maintain the continuous flow of liquid via the duct 38 is determined for example by dimensions of the rim 46 and elasticity and dimensions of the diaphragm 16. Variations in, inter alia, those dimensions may result in that pressure of liquid in the pipe being smaller, larger or equal to the predetermined threshold level PT.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Although the present embodiment has been described to a certain degree of particularity, it should be understood that various alterations and modifications could be made without departing from the scope of the disclosure as hereinafter claimed.

What is claimed is:

1. A drip irrigation emitter comprising:
   an inlet through which liquid enters the emitter from an irrigation pipe,
   an outlet communicating with the outside environment,
   a flow path extending between the inlet and outlet, said flow path comprising pressure reducing flow parts, a venting zone and a regulating zone, the regulating zone for regulating the flow of liquid exiting the emitter via the outlet,
   the emitter further comprising a duct that is adapted to provide fluid communication between the venting zone and the outside environment, wherein the duct allows fluid to bypass the regulating zone and the outlet at pressures above a threshold pressure of liquid in the pipe.

2. The drip irrigation emitter according to claim 1, wherein the venting zone is located between the pressure reducing parts and the regulating zone.

3. The drip irrigation emitter according to claim 2, comprising a seal for preventing fluid communication via the duct below the threshold pressure and allowing fluid communication via the duct above the threshold pressure.

4. The drip irrigation emitter according to claim 3, wherein the duct comprises pressure reducing parts downstream of the seal.

5. The drip irrigation emitter according to claim 1, comprising a seal for preventing fluid communication via the duct below the threshold pressure and allowing fluid communication via the duct above the threshold pressure.

6. The drip irrigation emitter according to claim 5, wherein the duct comprises pressure reducing parts downstream of the seal.

7. The drip irrigation emitter according to claim 5, wherein allowing fluid communication via the duct above the threshold pressure is formed by the seal being moved away from a position sealing the duct.

8. The drip irrigation emitter according to claim 7, wherein the seal is moved away from the position sealing the duct due to the threshold pressure of liquid that is reached in the pipe.

9. The drip irrigation emitter according to claim 7, wherein after lifting to allow the fluid communication, the seal moves back to a position where it seals the duct.

10. The drip irrigation emitter according to claim 9, wherein if the pressure of liquid in the pipe is still at the threshold level, the seal moves again away from a position sealing the duct.

11. The drip irrigation emitter according to claim 1 and comprising a body, a cover and a flexible diaphragm pressed between the body and cover, and at least part of the flow path is formed between the diaphragm and body and between the diaphragm and cover.

12. The drip irrigation emitter according to claim 11, wherein a portion of the diaphragm is located below the regulating zone.

13. The drip irrigation emitter according to claim 12, wherein the portion of the diaphragm is adapted to be displaced into the regulating zone due to rise of liquid pressure in the pipe.

14. The drip irrigation emitter according to claim 13, wherein displacement of the portion of the diaphragm into the regulating zone increases resistance of flow into the regulating zone.

15. The drip irrigation emitter according to claim 1, wherein the fluid communication between the venting zone and the outside environment is in the form of pulses.

16. The drip irrigation emitter according to claim 15, wherein the pulses are formed by the duct being sealed and unsealed.

17. A drip irrigation emitter for receiving liquid flowing in an irrigation pipe at an inlet pressure and emitting the liquid out of the emitter at an outlet pressure lower than the inlet pressure,
    the emitter comprising a flow path through which the liquid flows in the emitter, wherein
    below a threshold pressure of liquid in the pipe the emitter is adapted to emit a regulated flow of liquid out of the emitter through an outlet, and wherein above the threshold pressure of liquid in the pipe the emitter is adapted to at least partially emit a substantially non-regulated flow of liquid out of the emitter through a duct, wherein the duct allows fluid to bypass the outlet.

18. The drip irrigation emitter according to claim 17, wherein the flow path comprises a regulating zone that is adapted to regulate the flow of liquid out of the emitter below the threshold pressure of liquid in the pipe, and wherein above the threshold pressure of liquid in the pipe the flow of liquid out of the emitter is substantially not affected by the regulating zone.

19. A drip irrigation emitter comprising:
    an inlet through which liquid enters the emitter from an irrigation pipe,
    an outlet communicating with the outside environment,
    a flow path extending between the inlet and outlet, said flow path comprising pressure reducing flow parts, a venting zone and a regulating zone, the regulating zone for regulating the flow of liquid exiting the emitter via the outlet, wherein
    the emitter is adapted to provide fluid communication between the venting zone and the outside environment through a duct that bypasses the outlet at pressures above a threshold pressure of liquid in the pipe, and wherein the fluid communication is in the form of pulses.

20. The drip irrigation emitter according to claim 19 and comprising a seal for sealing the duct below the threshold pressure in the pipe and for unsealing the duct above the threshold pressure in the pipe.

21. The drip irrigation emitter according to claim 20, wherein the pulses are formed by the duct being sealed and unsealed by the seal.

22. A drip irrigation emitter comprising:
    a cover, a body having an upper side and a lower side, and a flexible diaphragm located between the lower side of the body and the cover;

an inlet extending through the cover, the inlet configured to allow fluid to enter the emitter below the diaphragm;

an outlet extending through the body, the outlet being located above a first portion of the diaphragm, and the diaphragm being displaceable toward the outlet in response to sufficient liquid pressure applied at the inlet; wherein:

the body is provided with a valve distinct from the outlet, the valve including a duct extending between the lower and upper sides of the body, and a seal; and the seal is configured to permit fluid to pass through the duct and exit the emitter, in response to liquid pressure applied at the inlet exceeding a predetermined threshold.

23. The drip irrigation emitter according to claim 22, wherein:

the upper side of the body has a peripheral wall defining a recess; and the outlet and the duct both provide a fluid path from the lower side of the body to the recess.

24. The drip irrigation emitter according to claim 22, wherein:

the duct has a first part located above a second portion of the diaphragm, the first part extending between the upper and lower sides of the body; and the duct has a second part formed on the upper side of the body, the second part connected to the first part.

25. The drip irrigation emitter according to claim 24, wherein:

the second part of the duct is provided with pressure reducing parts located downstream of the seal.

26. The drip irrigation emitter according to claim 24, wherein:

the valve further comprises a bracket provided on the upper side of the body and covering at least a portion of the second part of the duct, the bracket having an opening that is located above the seal, the opening configured to receive at least a portion of the seal, when the seal stretches in response to liquid pressure applied at the inlet exceeding a predetermined threshold.

27. The drip irrigation emitter according to claim 24, wherein:

the valve has a raised rim which circumscribes the first part of the duct;

the raised rim is surrounded by a concave hub which connects to the second part of the duct;

a raised support is formed in the hub and spaced apart from the raised rim; and the seal is located in the hub, with a periphery of the seal resting on the raised support and a central portion of the seal being seated on the raised rim.

28. The drip irrigation emitter according to claim 27, wherein:

the valve further comprises a bracket provided on the upper side of the body and covering at least a portion of the second part of the duct, the bracket having an opening that is located above the seal, the opening configured to receive at least a portion of the seal, when the seal stretches in response to liquid pressure applied at the inlet exceeding a predetermined threshold.

\* \* \* \* \*